United States Patent [19]
Smith

[11] 3,938,631
[45] Feb. 17, 1976

[54] GEARING WITH SPEED RESPONSIVE STARTING CLUTCHES

[75] Inventor: Lyle B. Smith, Westland, Mich.
[73] Assignee: General Motors Corporation, Detroit, Mich.
[22] Filed: July 8, 1974
[21] Appl. No.: 486,525

[52] U.S. Cl............ 192/3.52; 74/752 C; 192/87.12; 192/103 F; 192/113 B
[51] Int. Cl.²... F16H 3/74; F16H 5/36; F16D 25/10
[58] Field of Search............. 192/3.52, 3.57, 103 F, 192/105 F, 85 R, 87.12; 74/752 C, 103 F

[56] References Cited
UNITED STATES PATENTS

| | | | |
|---|---|---|---|
| 794,899 | 7/1905 | Sturtevant...................... | 192/3.57 X |
| 2,794,349 | 6/1957 | Smirl............................ | 192/87.12 X |
| 3,177,993 | 4/1965 | Riehl............................ | 192/103 F X |
| 3,263,782 | 8/1966 | Smirl et al..................... | 192/85 R X |
| 3,823,621 | 7/1974 | Kubo et al. .................... | 192/103 X |

Primary Examiner—Benjamin W. Wyche
Attorney, Agent, or Firm—Donald F. Scherer

[57] ABSTRACT

A drive arrangement for an engine driven vehicle in which the clutch engaging pressure is controlled in response to engine speed and vehicle speed during startup. The fluid output pressure from an engine driven control pump, which supplies fluid for clutch engagement and transmission control, is directed through a control valve and a control restriction. As engine speed is increased, the fluid pressure and clutch engagement force increase at a controlled rate, due to the increasing line pressure caused by the control restriction, to permit controlled starting of the vehicle. An output driven governor supplies pressure proportional to vehicle output speed to the control valve such that, at a predetermined vehicle output speed, the control valve is shifted to discontinue fluid communication between the engine driven pump and the control restriction at which instant the pump pressure is controlled by the transmission control regulator valve.

1 Claim, 3 Drawing Figures

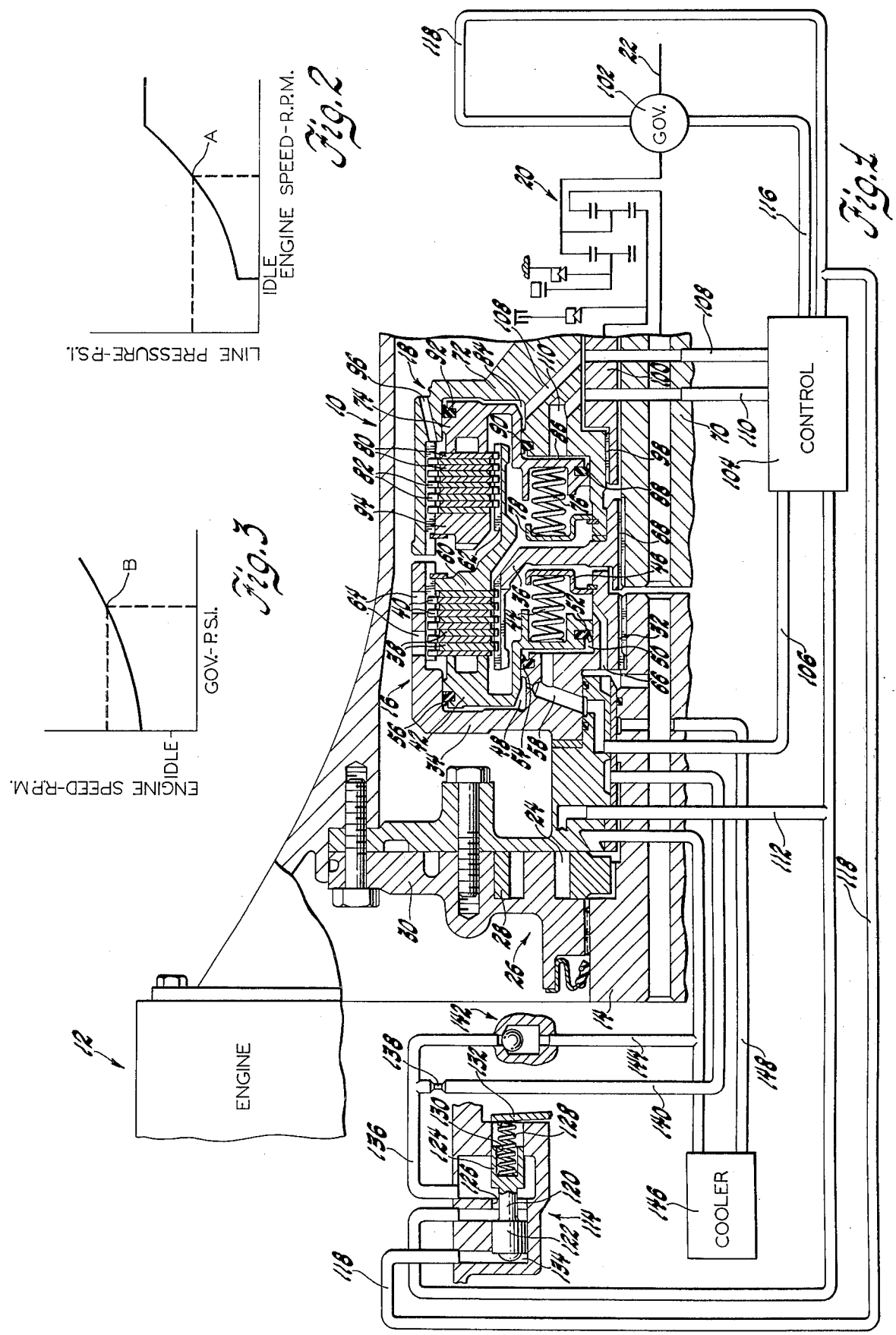

GEARING WITH SPEED RESPONSIVE STARTING CLUTCHES

This invention relates to starting clutches and controls and more particularly starting clutches and controls wherein the clutch pressure is responsive to engine speed and vehicle speed.

The present invention, in the preferred embodiment, is utilized to eliminate the conventional fluid drive unit in a transmission drive arrangement having input clutches for connecting the fluid drive unit to automatic shifting planetary gearing. It is well known that, if the torque converter or fluid coupling is removed from the conventional automatic type transmissions, an increase in overall efficiency and therefore fuel economy is attained. Prior art arrangements replacing or bypassing the fluid drive unit are well known. Some of these prior art devices incorporate a lockup clutch which effectively removes the fluid drive unit from the drive arrangement during certain phases of operation; while other prior art arrangements replace the torque converter with a starting clutch. These latter prior art devices maintain the input clutches normally used with the drive arrangement while incorporating the starting clutch to provide the slip function usually obtained through the fluid drive unit during startup. When the fluid drive unit is replaced with a starting clutch, sophisticated centrifugally operated controls have been incorporated into the system to provide the desired startup engagement of the clutch.

The present invention eliminates the torque converter from the drive arrangement and utilizes the existing input clutches of the drive arrangement as starting clutches. Thus the expense of an additional clutch for starting is eliminated. The present invention also incorporates a simple control system which will control the engagement of the input clutches during starting proportional to engine speed and therefore provide the operator with a means of controlling clutch engagement. This control system is easily incorporated into the control systems presently used with automatic type transmissions.

In most automatic transmissions used today, there are two input clutches. One clutch is engaged during forward drive and the other clutch is engaged during reverse drive. An example of such a drive arrangement is shown in United States Patent Numbers 2,856,794 and 3,321,056. The latter patent also discloses a control system for energizing the various friction drive devices of the transmission. The present invention can be incorporated into such well known control systems by the addition of a vehicle governor controlled valve which is operative in cooperation with a control restriction to establish control pressure in the system during startup. When the vehicle has obtained a predetermined speed, governor pressure shifts the added valve to permit the system pressure to be controlled by the normal regulator valve of the control system.

The present invention has a further advantage in that during engine idle and during vehicle startup the transmission control is maintained at lower pressure levels which also provide increased efficiency.

The present invention can be utilized with both internal combustion engines and gas turbine engines. When the invention is used with the internal combustion engine the preformance decreases slightly below that obtained with a torque converter, since the torque multiplication factor of the converter is not present. However, when the present invention is utilized with a gas turbine engine, the high stall torque characteristic of the turbine engine partially compensates for the torque multiplication loss due to the elimination of the converter.

It is therefore, an object of this invention to provide an improved drive arrangement wherein the engagement pressure of the transmission input clutches is controlled proportional to engine speed during startup.

Another object of this invention is to provide an improved drive arrangement wherein conventional input clutches have controlled engagement during startup in forward or reverse drive and wherein the engagement pressure is proportional to engine speed below a predetermined engine speed.

A further object of this invention is to provide an improved drive arrangement having a forward input clutch, a reverse input clutch, and a control valve and restriction for controlling the engagement pressure of the clutches during startup and wherein the control maintains an engagement pressure of the clutches proportional to engine speed until a predetermined vehicle speed is obtained.

These and other objects and advantages of the present invention will be more apparent from the following description and drawings wherein:

FIG. 1 is a cross sectional view partly in diagrammatic form showing the preferred embodiment of the invention;

FIG. 2 is a graph showing the relationship between engine speed and line pressure with the present invention;

FIG. 3 is a graph showing the relationship between engine speed and governor pressure with the present invention.

Referring to the drawings and particularly FIG. 1 there is shown a transmission generally designated 10 coupled to an engine generally designated 12. The engine may be either an internal combustion engine or a gas turbine engine. The transmission drive arrangement includes an input shaft 14 drivingly connected to the engine 12, a forward input clutch 16, a reverse input clutch 18, a planetary gearing arrangement 20, and an output shaft 22. The input shaft 14 is drivingly connected to the internal gear 24 of a conventional internalexternal type gear pump 26 which also includes an external gear 28. The internal and external gears 24 and 28 are rotatably mounted in a housing 30 which is secured to the housing of the transmission 10. The input shaft 14 is also drivingly connected through splines 32 to an input clutch housing 34 which forms a part of the forward clutch 16.

The forward clutch 16 also includes an output member 36, a plurality of friction discs or plates 38 and 40 which are splined to the members 34 and 36 respectively, an annular piston 42 and plurality of return springs, such as 44, which are compressed between the piston 42 and a retainer ring 46. The piston 42 is slidably disposed in the housing 34 and cooperates therewith to form fluid chambers 48 and 50, which chambers are made fluid tight by a plurality of annular lip seals 52, 54 and 56. Fluid pressure is admitted to the chambers 48 and 50 through a passage 58 formed in the housing 34. The clutch 16 also includes a backing plate 60 which is splined to the housing 34 and has a radially extending splined portion 62 which provides an input from the shaft 14 to the reverse input clutch 18 through the housing 34.

A plurality of openings 64 are provided in the outer periphery of the housing 34 to permit the flow of cooling and lubrication fluid through the clutch plates 38 and 40 during engagement of clutch 16. The lubrication and cooling fluid is admitted to the clutch 16 through a passage 66 formed in the housing 34 and pump housing 30. Thus the fluid enters the inner portion of the clutch 16, is circulated through the clutch plates 38 and 40 and exits through opening 64. The backing plate 60 provides a reaction surface for the friction discs such that the clutch will be engaged by the piston 42 when fluid pressure is delivered to the chambers 48 and 50. When the clutch 16 is engaged a drive connection is established between the input shaft 14 and the output member 36. The torque transmission through the clutch is controlled by the fluid pressure level in the chambers 48 and 50 and can therefore be maintained as a slipping connection. The output member 36 is splined at 68 to an intermediate shaft 70 which is drivingly connected to a portion of the planetary gearing arrangement 20.

The reverse input clutch 18 includes a housing 72, an annular piston 74 slidably disposed in the housing 72, a plurality of return springs 76 compressed between the piston 74 and a retainer plate 78, and a plurality of friction discs or plates 80 and 82 splined to members 60 and 72 respectively. The piston 74 and housing 72 cooperate to provide a pair of fluid chambers 84 and 86 which are made fluid tight by a plurality of annular lip seals 88, 90, and 92. An annular backing plate 94 is also splined to the housing 72 to provide a reaction member for the friction discs 80 and 82 when the clutch 18 is engaged by fluid pressure in the chambers 84 or 86. Clutch 18 can also be maintained as a slipping connection depending on the engagement pressure in chambers 84 and 86.

A plurality of passages, such as 96, are formed in the housing 72 to permit the circulation of cooling and lubrication fluid between the friction plates 80 and 82 during engagement of the clutch 18. The fluid for cooling and lubrication may be admitted to the inner portion of the clutch 18 in any well known manner.

The housing 72 is splined at 98 to a sleeve shaft 100 which is drivingly connected to the planetary gearing arrangement 20. The planetary gearing arrangement 20 shown is of the well known "Simpson" type which is disclosed in U.S. Pat. No. 2,856,794. The particular planetary gearing arrangement shown does not form part of this invention, since the present invention may be used with any gearing arrangement which incorporates forward or reverse input clutches. The invention may also be used in transmission drive arrangements wherein a torque converter normally provides the input drive for both forward and reverse operation by replacing the torque converter with a single input clutch.

The transmission output shaft 22 is drivingly connected in a well known manner to a conventional fluid governor 102 which may be designed in accordance with the governor shown in U.S. Pat. No. 3,762,384. 2,762,384. As is well known with these types of fluid governors, a pressure signal is generated therein which is proportional to the speed of the transmission output shaft and therefore the speed of the vehicle.

The forward clutch 16 is in fluid communication with a transmission control 104 through a passage 106 and passage 58. The reverse clutch 18 is in fluid communication with the control 104 through passages 108 and 110 which passages also extend through the housing 72. The control 104 may be built in accordance with any of the well known automatic transmission controls and preferably is constructed in accordance with the transmission control disclosed in U.S. Pat. No. 3,321,056. Fluid pressure for operating the control 104, clutches 16 and 18, governor 102 and other friction devices in the transmission is supplied by the pump 26. Fluid flow delivered by the pump 26 is conducted through a passage 112 to the control 104 and to a control valve generally designated 114. The cooling and lubricating oil for the forward clutch is the same oil that is directed through the control restriction and it is shut off by the governor controlled shuttle valve 114. This prevents horsepower losses from excess cooling oil circulation after the clutch 16 is locked up. Fluid delivered to the control 104 is also distributed via passage 116 to the governor 102. Fluid pressure from the governor 102 is delivered through passage 118 to the control 104 and to the control valve 114. Since the pump 26 is driven by the engine 12 and since the pump 26 is a positive displacement pump, the fluid flow in passage 112 will be proportional to engine speed.

The valve 114 includes a valve spool 120 having equal diameter spaced lands 122 and 124 slidably disposed in a valve bore 126, and a compression spring 128 compressed between an internal pocket 130 formed in valve land 124 and a retainer 132. The valve bore 126 is in fluid communication with the governor pressure passage 118 at a chamber 134 formed by valve land 122 and valve bore 126. Governor pressure in passage 118 thus acts on the valve spool 120 to move the valve spool against the force in spring 128 when a predetermined governor pressure or vehicle speed is attained. The valve bore 126 is also in fluid communication with a passage 112 and with a passage 136. When the valve spool 120 is in the position shown, the passages 112 and 136 are in fluid communication between lands 122 and 124 such that part of the fluid delivered by pump 26 is delivered to passage 136. When the valve spool 120 has been shifted by governor pressure in chamber 134, the passage 112 will be blocked by valve land 122 such that substantially all the fluid delivered by the pump 26 is directed to the control 104. The passage 136 is in fluid communication with a passage 140 through a control restriction 138, which passage 140 delivers fluid to pump housing 30 from which the fluid is distributed for lubrication and cooling of the clutches 16 and 18. The passage 136 is also in fluid communication through a ball check valve 142 with a passage 144, which passage 144 is in fluid communication with a conventional transmission cooler 146. Fluid from the cooler 146 is delivered by passage 148 to the transmission gearing clutches and ball to provide lubrication. The ball check valve 142 provides lubrication flow and cooling for the clutch 18 during reverse drive operation. During normal transmission operation the pump pressure regulator valve establishes line pressure priority over lubrication feed. In reverse operation, the reverse input clutch 18 would normally have no lubrication and would burn up on a reverse start. Therefore, some of the oil orificed from line pressure through restriction 138 and passage 140 directed to clutch 18 through the normal lubrication circuit. However, after clutch 16 is in lock-up, the ball check 142 prevents normal lube from feeding into the starting clutch lubrication circuit.

With the engine 12 running at idle, the valve 114 will be in the position shown. Under this condition the fluid from pump 26 is delivered through valve 114 and through restriction 138. The fluid flow through the restriction 138 establishes the output pressure of the pump 26 which is of course the pressure available at control 104. Assuming the operator manipulates the control 104 to establish a forward drive for the transmission 10, the control 104 will direct fluid pressure to passage 106, to engage clutch 16. The engagement pressure is established by the pressure drop through restriction 138. Under engine idle conditions this pressure is low and is not sufficient to overcome the force of return springs 44 of clutch 16. However, if the operator increases the speed of engine 12, fluid flow from pump 26 will increase and the back pressure caused by restriction 138 will increase in accordance with the graph shown in FIG. 2. The engine speed and fluid pressure in passage 112 will continue to increase until point A shown in FIG. 2 is reached. At this time there is sufficient pressure to initiate engagement of clutch 16. As clutch 16 begins to engage, a drive relationship is established between the input shaft 14 and the output shaft 22. The engine speed and therefore clutch engagement pressure will continue to rise until engagement pressure is sufficient to cause the clutch to have sufficient capacity to transmit the engine torque through the gearing 20 to the output shaft 22. Assuming the torque at this point is sufficient to enable vehicle acceleration, the engine speed and clutch pressure will generally increase also unless the engine is operating at maximum torque.

If the engine is operating at maximum torque, such as at wide open throttle start, the vehicle will accelerate until the clutch input and output speeds are substantially equal at which time the engine and vehicle speeds will both increase. As the vehicle speed increases, governor pressure in passage 118 will also increase. Since the planetary gearing 20 establishes a fixed drive ratio between the input and output shafts of the transmission, the engine speed and governor pressure are substantially proportional in a manner such as that shown in FIG. 3. The relationship shown in FIG. 3 is one of a series of curves which can be drawn for various engine throttle and torque transmission characteristics of the engine and drive arrangement. As long as there is sufficient engine torque to accelerate the vehicle, a predetermined vehicle speed will be attained under the various throttle setting conditions. When the predetermined vehicle speed is attained, as represented by point B of FIG. 3, the governor pressure in passage 118 will be sufficient to cause the valve spool 120 to be shifted against spring 128 to prevent fluid communication between passage 112 and 136. At this instant, the transmission control pressure will be established in a well known manner by the control 104. After the valve spool 120 has been shifted, the transmission 10 will then operate in the conventional upshifting and downshifting manner, such as that disclosed in U.S. Pat. 3,321,056, until the operator releases the throttle to permit the vehicle to come to rest. When the vehicle is decelerating, the governor pressure in passage 118 will decrease. When the governor pressure is decreased sufficiently to permit valve spool 120 to return to the position shown, the fluid pressure of pump 26 is again controlled by the restriction 138 which as explained above is proportional to engine speed, thus on deceleration of the vehicle the clutch 16 will also provide a slipping connection.

If the operator selects a reverse drive in the control 104, clutch 18 will be controlled in a manner similar to that described above for clutch 16, in that the control pressure for engagement of the clutch is established for passages 108 and 110 at a level controlled by fluid flow through the restriction 138.

Obviously, many modifications and variations of the present invention are possible in light of the above teachings. It is, therefore, to be understood that within the scope of the appended claims the invention may be practiced otherwise than as specifically described.

What is claimed is:

1. A drive arrangement for an engine driven vehicle comprising; an input shaft driven by the engine; fluid pump means driven by said input shaft for supplying fluid flow proportional to engine speed; forward and reverse fluid operated starting clutch means each having an input member driven by said input shaft and an output member; planetary gear means drivingly connected to said output members and being selectively operable for providing forward and reverse drive ratios for the vehicle, control means in fluid communication with said pump means for controlling the operation of said planetary gear means and said clutch means; control valve means and restriction means in fluid communication with said pump means for controlling the fluid pressure output of said pump means proportional to engine speed only when the vehicle speed is below a predetermined value, said restriction means being downstream of said control valve means; and vehicle speed signal means for supplying a pressure signal proportional to vehicle speed for operating said control valve means in response to vehicle speed only to discontinue fluid communication between said pump means and said restriction means.

* * * * *

UNITED STATES PATENT AND TRADEMARK OFFICE
CERTIFICATE OF CORRECTION

PATENT NO. : 3,938,631
DATED : February 17, 1976
INVENTOR(S) : Lyle B. Smith

It is certified that error appears in the above-identified patent and that said Letters Patent are hereby corrected as shown below:

Column 1, line 12, "unit" should be -- units --.

Column 3, line 60, "3,762,384" should be deleted.

Column 4, line 66, "16" should read -- 18 --.

Signed and Sealed this twenty-seventh Day of April 1976

[SEAL]

Attest:

RUTH C. MASON
Attesting Officer

C. MARSHALL DANN
Commissioner of Patents and Trademarks